United States Patent [19]

Egberg

[11] Patent Number: 4,865,646

[45] Date of Patent: Sep. 12, 1989

[54] OFFSET FOUNTAIN SOLUTION TO REPLACE ISOPROPYL ALCOHOL

[76] Inventor: David C. Egberg, 2845 Jewel La., Plymouth, Minn. 55447

[21] Appl. No.: 140,124

[22] Filed: Dec. 31, 1987

[51] Int. Cl.[4] .................... C09K 3/18

[52] U.S. Cl. .................... 106/2; 106/197.2

[58] Field of Search .................... 106/2, 197.2; 430/302, 430/309; 101/451, 457

[56] References Cited

U.S. PATENT DOCUMENTS

| | | | |
|---|---|---|---|
| 4,548,645 | 10/1985 | Thiebaut | 106/2 |
| 4,560,410 | 12/1985 | Burns et al. | 101/451 |

*Primary Examiner*—Amelia Burgess Yarbrough

*Attorney, Agent, or Firm*—Hugh D. Jaeger

[57] ABSTRACT

A formula for a fountain solution which maintains an ink-free non-image area without the use of isopropyl alcohol. The present invention pertains to an improved method for offset printing with the fountain solution.

6 Claims, No Drawings

OFFSET FOUNTAIN SOLUTION TO REPLACE ISOPROPYL ALCOHOL

BACKGROUND OF THE INVENTION

1. Field of the Invention

The present invention pertains to formulas for a fountain solution used in offset printing.

2. Description of the Prior Art

In the prior art offset printing processes, ink is transferred via rollers to a plate comprised of a hydrophilic metal oxide which is the non-image area and to a lipophilic image area. The plate is continually supplied with ink and with a fountain solution. The function of the fountain solution is to inhibit the transfer of ink to the non-image area.

Typically, fountain solutions contain a vast array of ingredients, many of questionable functionality. Universal ingredients, however, include a pH buffering system (e.g., phosphate or citrate), gum arabic, any one of a large selection of surfactants e.g. (aryl and alkyl sulfonates, polyethylene or polypropylene oxide), and a solvent such as isopropyl alcohol.

Isopropyl alcohol is commonly used in the fountain solution at levels between 10–35%. This alcohol evaporates in the press room creating environmental, pollution and safety problems.

The present invention overcomes the disadvantages of the prior art by providing a preferred offset fountain solution without isopropyl alcohol.

SUMMARY OF THE INVENTION

The general purpose of the present invention is to provide an offset fountain solution formula which does not include isopropyl alcohol.

According to one embodiment of the present invention, there is provided an offset fountain solution by combining a low viscosity carboxymethyl cellulose derivative (approximate M.W. 65,000) a hydrotrope dispersant (sodium xylene sulfonate) and unique surface active surfactant materials (Surfynol TM derivatives by Air products), thereby providing a distinctly improved formula. This formula maintains an extremely clean non-ink area of the printing plate without the use of the pollutant isopropyl alcohol.

The Surfynol TM series is chosen for their unique properties including no micelle formation, low dynamic surface tension and no foam.

One significant aspect and feature of the present invention is an offset fountain solution that does not utilize isopropyl alcohol.

Another significant aspect and feature of the present invention is an offset fountain solution that provides improved worker health safety about press environment.

A further significant aspect and feature of the present invention is an offset fountain solution that provides minimal atmospheric pollution.

Still another significant aspect and feature of the present invention is an offset fountain solution that is cost effective and provides an enhanced image.

DESCRIPTION OF THE PREFERRED EMBODIMENTS

The fountain solution concentrate mixture is formulated by dissolving carboxymethyl cellulose and the phosphate salts in deionized water. The Surfynol TM surfactants by Air Products are added along with the sodium xylene sulfonate and glycol co-solvents. A preferred formula is shown below in Table 1. The ratio of phosphate salt potassium pyrophosphate ($K_4P_2O_7$) to phosphoric acid ($H_3PO_4$) may be changed to adjust the pH to fit the particular printing press conditions.

TABLE 1

| Fountain Solution Concentrate Preferred Formula | Wt. |
|---|---|
| Deionized Water | 21.2 kg |
| Potassium Pyrophosphate | 408.6 gm |
| Phosphoric Acid 85% | 181.6 gm |
| Carboxymethyl cellulose (Ambergum 1221 TM) | 1.36 kg |
| Propylene Glycol | 3.26 kg |
| Ethylene Glycol | 6.45 kg |
| Surfynol 440 TM | 227.0 gm |
| Surfynol 61 TM | 544.8 gm |
| Surfynol 104 TM (85% in EG) | 454.0 gm |
| 42% solution in water of sodium xylene sulfonate | 11.35 kg |

The Surfynols TM which are hydrophobic surfactants are now listed below in Table 2

TABLE 2

| Air Product No. | Surfynol Chemical Compositions |
|---|---|
| 61 | 3,5-dimethyl-1-hexyn-3-ol |
| 440 | 2,4,7,9-tetra-methyl-5-decyne-4,7-diol (Ethyloxylated with average of 3.5 moles ethylene oxide) |
| 104 | 2,4,7,9-tetra-methyl-5-decyne-4,7-diol |

A formula of acceptable ranges for the components is now set forth in Table 3.

TABLE 3

| Fountain Solution Concentrate Acceptable Ranges | Wt. Percent |
|---|---|
| Deionized Water | 40–82% |
| Potassium Pyrophosphate | 0.2–2.0% |
| Phosphoric Acid 85% | 0.2–4.0% |
| Carboxymethyl cellulose (Ambergum 1221 TM) | 0.5–4.0% |
| Propylene Glycol | 3.0–10% |
| Ethylene Glycol | 12.0–15% |
| Surfynol 440 TM | 0–0.6% |
| Surfynol 61 TM | 0.8–1.6% |
| Surfynol 104 TM (85% EG) | 0.3–2.0% |
| 42% solution in water of sodium xylene sulfonate | 1.0–25.0% |
| Total | 100% |

MODE OF OPERATION

The fountain solution concentrate is diluted with water in the press room at a weight ratio of 1:70 to 1.20 (fountain solution concentrate to water) to form the fountain solution. This fountain solution is delivered to the printing plate with aluminum oxide by any one of a number of methods, including roller, spray, or brush systems such as those manufactured by Dahlgren, Harris Duo-Trol, Miehle-Matic, Roland-Matic, etc.

Since the fountain solution concentrate is effective at different dilutions, it is obvious that there exists some latitude in the level of key components or ingredients used in the formula.

Ingredient Functionality

The water serves as a carrier for the water soluble polymer and the buffering system.

The phosphoric acid and pyrophosphate salt buffer is used to control pH. Citrates or other phosphates can also be used.

The carboxymethyl cellulose is a hydrophylic polymer which coats roe non-image area of the printing plate holding water and repelling ink. Other hydrophylic polymers which can be used are gum arabic, polyethylene glycol the or gellan (such as by Kelco Co.).

The ethylene and propylene glycol act as a cosolvent. The sodium xylene sulfonate acts as a hydrotrope dispersant. Their function is to dissolve and disperse the Surfynol TM surfactants. Hydrotrope dispersants can also include analogous alkyl benzene sulfonates.

The Surfynol TM surfactants are uniquely suited for a fountain solution; they effectively decrease the water surface tension and wet the printing plate with a minimum of foam formation. These surfactants do not form a micelle which carries ink into the fountain solution which is detrimental to fountain solution functionality. Because of their comparatively low molecular weight versus other commercial surfactants, the Surfynol TM of Air Products used in this present invention diffuse rapidly to a surfactant depleted interface and consequently give rise to low surface tension at high depletion rates. This property is called low dynamic surface tension and is ideal for fountain solutions used on very high speed printing presses.

Various modifications can be made to the present invention without departing from the apparent scope thereof. The groupings of the chemical compositions and concentrations can be varied as may be required. Equivalent or like surfynols can be substituted for those surfynols disclosed. The percent of water solution can be varied in a suitable range as may be required.

I claim:

1. Fountain solution comprising:

| | | Wt. Percent |
|---|---|---|
| a. | Deionized Water | 40–82% |
| b. | Potassium Pyrophosphate | 0.2–2.0% |
| c. | Phosphoric Acid 85% | 0.2–4.0% |
| d. | Carboxymethyl cellulose (Ambergum 1221 TM) | 0.5–4.0% |
| e. | Propylene Glycol | 3.0–10% |
| f. | Ethylene Glycol | 12.0–15.8% |
| g. | [Surfynol 61 TM] Ethoxylated 2,4,7,9-tetra-methyl-5-decyne-4,7-diol | 0.8–1.6% |
| h. | [Surfynol 104 TM (85% EG)] 3,5,-dimethyl-1-hexyne-3-ol | 0.3–2.0% |
| i. | [Surfynol 440 TM] 2,4,7,9-tetra-methyl-5-decyne-4, 7-diol | 0–0.6% |
| j. | 42% solution in water of sodium xylene sulfonate | 1.0–25%, |

2. In a fountain solution concentrate comprising a hydrophilic polymer and water, the improvement which comprises the presence in the concentrate of:

a. a hyrdophobic surfactant consisting of 3,5-dimethyl-1-hexyn-3-ol; 2,4,7,9-tetra-methyl-5-decyne-4,7-diol; or an ethoxylated 2,4,7,9-tetra-methyl-5-decyne-4,7-diol;

b. a hydrotrope dispersant for (a); and, c. a solvent system for (a).

3. A fountain solution concentrate comprising:

| | | | |
|---|---|---|---|
| a. | Water | 21.1 | kg |
| b. | Potassium pyrophosphate | 408.6 | g |
| c. | Phosphoric acid (85%) | 181.6 | g |
| d. | Carboxymethyl cellulose | 1.36 | kg |
| e. | Propylene glycol | 3.26 | kg |
| f. | Ethylene glycol | 6.45 | kg |
| g. | Ethoxylated 2,4,7,9-tetra-methyl-5-decyne-4,7-diol | 227.0 | g |
| h. | 3,5,-dimethyl-1-hexyne-3-ol | 544.8 | g |
| i. | 2,4,7,9-tetra-methyl-5-decyne-4,7-diol | 454.0 | g |
| h. | Sodium xylene sulfonate 42% aqueous solution | 11.35 | kg |

4. The concentrate of claim 1 diluted with water to a concentrate/water weight ratio of 1–20 to 1–70.

5. The concentrate of claim 3 diluted with water to a concentrate/water weight ratio of 1–20 to 1–70.

6. The concentrate of claim 2 diluted with water to a concentrate/water weight ratio of 1–20 to 1–70.

* * * * *